US007007180B2

(12) United States Patent
Hashimoto

(10) Patent No.: US 7,007,180 B2
(45) Date of Patent: Feb. 28, 2006

(54) SYSTEM AND METHOD FOR SWITCHING A COMPUTER SYSTEM TO A FIRST OR SECOND POWER SAVING MODE BASED ON WHETHER OR NOT THERE EXISTS A TIMER-EXPIRATION-WAITING EVENT IN AN EVENT QUEUE

(75) Inventor: Shinichi Hashimoto, Tokyo (JP)

(73) Assignee: Access Co., Ltd., Tokyo (JP)

( * ) Notice: Subject to any disclaimer, the term of this patent is extended or adjusted under 35 U.S.C. 154(b) by 815 days.

(21) Appl. No.: 09/936,463

(22) PCT Filed: Jan. 15, 2001

(86) PCT No.: PCT/JP01/00183

§ 371 (c)(1),
(2), (4) Date: Sep. 10, 2001

(87) PCT Pub. No.: WO01/52027

PCT Pub. Date: Jul. 19, 2001

(65) Prior Publication Data

US 2003/0061526 A1    Mar. 27, 2003

(30) Foreign Application Priority Data

Jan. 13, 2000 (JP) .............................. 2000-004166

(51) Int. Cl.
*G06F 1/26*    (2006.01)

(52) U.S. Cl. ..................................................... 713/320

(58) Field of Classification Search ................ 713/300, 713/320
See application file for complete search history.

(56) References Cited

U.S. PATENT DOCUMENTS

| 5,511,202 A | | 4/1996 | Combs |
| 5,560,022 A | * | 9/1996 | Dunstan et al. .............. 713/300 |
| 5,638,541 A | * | 6/1997 | Sadashivaiah ............... 713/323 |
| 5,832,283 A | * | 11/1998 | Chou et al. .................. 713/300 |
| 6,000,035 A | * | 12/1999 | Matsushima et al. ........ 713/320 |
| 6,189,106 B1 | * | 2/2001 | Anderson .................... 713/300 |

(Continued)

FOREIGN PATENT DOCUMENTS

JP    2-311916    12/1990

(Continued)

*Primary Examiner*—Thomas Lee
*Assistant Examiner*—Mark Connolly
(74) *Attorney, Agent, or Firm*—Dellett & Walters

(57) ABSTRACT

A power saving method and device capable of dynamically select an appropriate power saving mode according to operation states of a computer system. When a power saving system task 15 detects that an execution queue 132 does not contain any executable user task and the computer system has entered an idle state, a power saving transition check module 154 checks if an event queue 131 contains a timer-expiration-waiting event. Depending upon whether or not the timer-expiration-waiting event is present, the computer system moves from a normal operation mode to a first or a second power saving operation mode, each power saving operation mode having its own power saving effect. A power saving mode release module 231 of an interrupt handler 23 returns the system from the first or second power saving operation mode to the normal operation mode in response to an occurrence of an interrupt. For example, in the first power saving operation mode, the CPU operation clock is stopped. In the second power saving operation mode, the CPU operation clock is stopped and, at the same time, a timer interrupt operation is disabled.

4 Claims, 6 Drawing Sheets

U.S. PATENT DOCUMENTS

| | | | |
|---|---|---|---|
| 6,457,132 B1 * | 9/2002 | Borgendale et al. | 713/320 |
| 6,678,831 B1 * | 1/2004 | Mustafa et al. | 713/320 |
| 6,816,977 B1 * | 11/2004 | Brakmo et al. | 713/323 |
| 6,832,263 B1 * | 12/2004 | Polizzi et al. | 709/246 |

FOREIGN PATENT DOCUMENTS

| | | |
|---|---|---|
| JP | 7-44469 | 2/1995 |
| JP | 7-295694 | 11/1995 |

* cited by examiner

F I G. 6
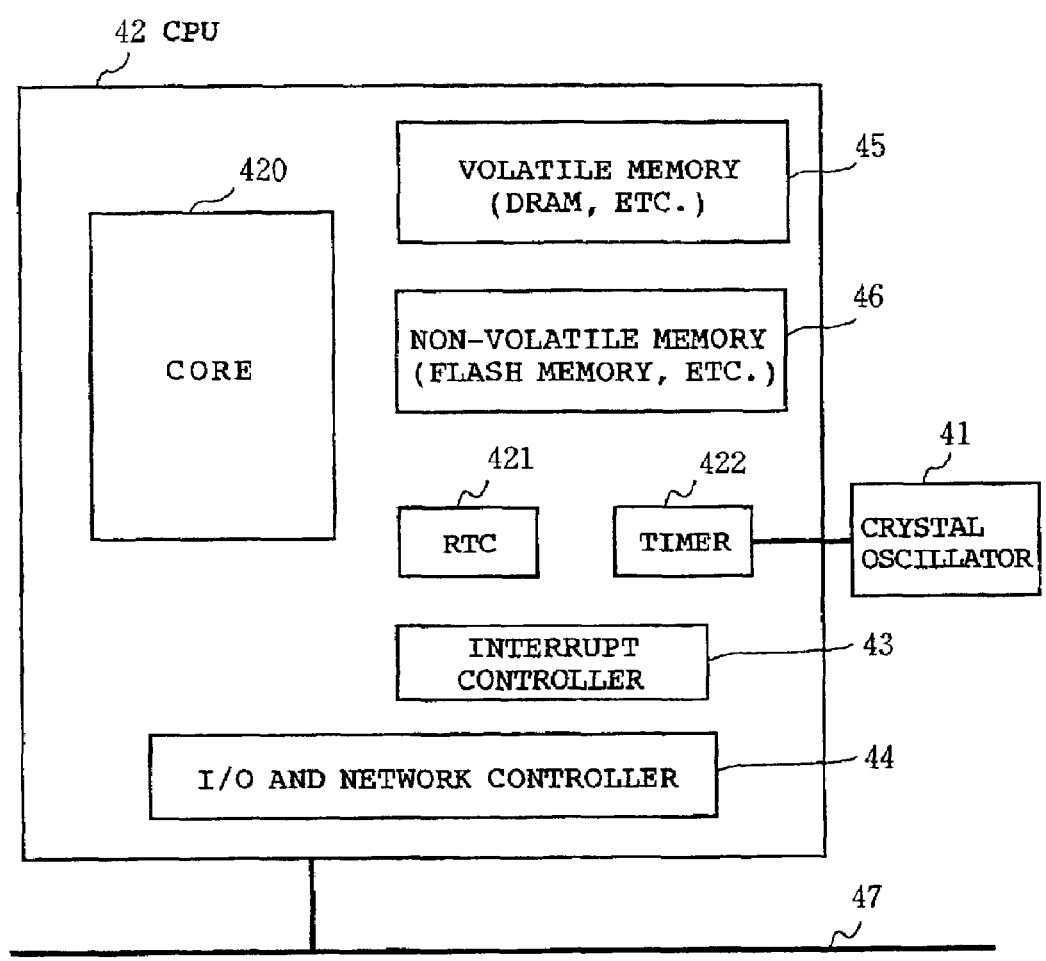

SYSTEM AND METHOD FOR SWITCHING A COMPUTER SYSTEM TO A FIRST OR SECOND POWER SAVING MODE BASED ON WHETHER OR NOT THERE EXISTS A TIMER-EXPIRATION-WAITING EVENT IN AN EVENT QUEUE

TECHNICAL FIELD

The present invention relates to the power saving function of a computer system, and more particularly to the power saving function implemented in a real-time operating system (real-time OS).

BACKGROUND ART

Conventionally, power saving has been an important technical issue, especially for battery-powered portable personal computers, PDAS, and other data processing devices, to extend the battery operation time. Some power saving method not only reduces static power consumption during operation but also dynamically minimizes power consumption depending upon operation states.

Japanese Patent Laid-Open Publication No. Hei 7-261889 discloses a system that has a pseudo device driver installed for power saving operations. The system periodically checks the last access time of each power-manageable hardware component in the computer system. Upon detecting a hardware component being in an idle state, the system orders the device driver corresponding to the idle-state hardware component to reduce power to be supplied to the idle-state hardware component.

Japanese Patent Laid-Open Publication No. Hei 9-101847 discloses a computer system that switches the CPU operation mode to a power saving mode when the event queue in the operating system does not contain any event. In the power saving mode, the system stops the CPU operation clock or stops the oscillator.

The prior art disclosed in the Japanese Patent Laid-Open Publication No. Hei 7-261889 described above takes time to detect an idle state. On the other hand, the prior art disclosed in Japanese Patent Laid-Open Publication No. Hei 9-101847 described above quickly detects an idle state.

However both prior-art systems provide general power saving modes, and there is yet room for improvement in flexible power saving.

In view of the foregoing, it is an object of the present invention to provide a power saving method and a power saving unit that dynamically select a more appropriate power saving mode depending upon operation states of the computer system.

DISCLOSURE OF INVENTION

A power saving control method for use on a computer system according to the present invention comprises the steps of checking an operation state of the computer system; switching the computer system from a normal operation mode to a first power saving mode when the computer system enters a first operation state; switching the computer system from the normal operation mode to a second power saving operation mode when the computer system enters a second operation state, the second power saving operation mode differing in power saving effect from the first power saving operation mode; and returning the computer system from the first or the second power saving operation mode to the normal operation mode according to a predetermined return condition.

This method allows the computer system to move to one of the operation modes, each having its own power saving effect, according to operation states of the computer system, thus making it possible to save power more flexibly.

More specifically, the power saving control method for use on a computer system according to the present invention comprises the steps of checking if any timer-expiration-waiting event is present in an event queue, which manages event-waiting tasks, when there is no executable user task and therefore a CPU has entered an idle state; switching the computer system to a first power saving operation mode when there is any timer-expiration-waiting event in the event queue, the first power saving operation mode stopping a CPU operation clock while allowing a timer interrupt to be accepted; switching the computer system to a second power saving operation mode when there is no timer-expiration-waiting event in the event queue, the second power saving operation mode disabling the timer interrupt while stopping the CPU operation clock; saving the time of a hardware timer when entering the second power saving operation mode; returning the computer system from the first or the second power saving operation mode to a normal operation mode in response to an occurrence of an interrupt; and detecting the time of the hardware timer when the computer system returns from the second power saving operation mode to the normal operation mode, calculating an elapsed time from the saved time, and correcting a timer value of a software timer based on the elapsed time.

The present invention allows the computer system to selectively move to one of the first and second power saving operation modes, each having its own power saving effect, depending upon the presence/absence of a timer expiration event and, therefore, makes it possible to control power saving more flexibly than before. In particular, temporarily disabling a timer interrupt when there is no timer-expiration-waiting event in the idle state minimizes a power loss that would be generated by returning to the normal operation mode each time a timer interrupt occurs.

A computer system according to the present invention comprises a CPU having a real-time operating system, wherein the real-time operating system comprises an execution queue that manages a queue of execution waiting tasks; an event queue that manages event waiting tasks; a power saving transition check module that checks if there is any timer-expiration-waiting event in the event queue when there is no executable user task in the execution queue and therefore a CPU has entered an idle state and, depending upon whether or not there is any timer-expiration-waiting event in the event queue, switches the computer system from a normal operation mode to a first power saving operation mode or to a second power saving operation mode that has a power saving effect different from that of the first power saving operation mode; and a power saving mode release module that returns the computer system from the first or the second power saving operation mode to the normal operation mode according to a predetermined return condition.

More specifically, when there is no executable user task and therefore the CPU has entered the idle state, the power saving transition check module switches the computer system to the first power saving operation mode when there is any timer-expiration-waiting event in the event queue, the first power saving operation mode stopping a CPU operation clock while allowing a timer interrupt to be accepted, switches the computer system to the second power saving operation mode when there is no timer-expiration-waiting event in the event queue, the second power saving operation mode disabling the timer interrupt while stopping the CPU operation clock and, at the same time saves the time of a hardware timer, and the power saving mode release module returns the computer system from the first or the second power saving operation mode to the normal operation mode in response to an occurrence of an interrupt, detects the time of the hardware timer, calculates an elapsed time from the saved time, and corrects a timer value of a software timer based on the elapsed time.

The present invention also includes a computer program itself that implements the above device or method and a recording medium readably storing thereon a program, as well as a microprocessor including a real-time operating system.

BRIEF DESCRIPTION OF DRAWINGS

FIG. 6 is a block diagram showing the hardware configuration of a microprocessor to which the present invention is applied.

BEST MODE FOR CARRYING OUT THE INVENTION

A preferred embodiment of the present invention will be described in detail below with reference to the attached drawings.

Figure 1:
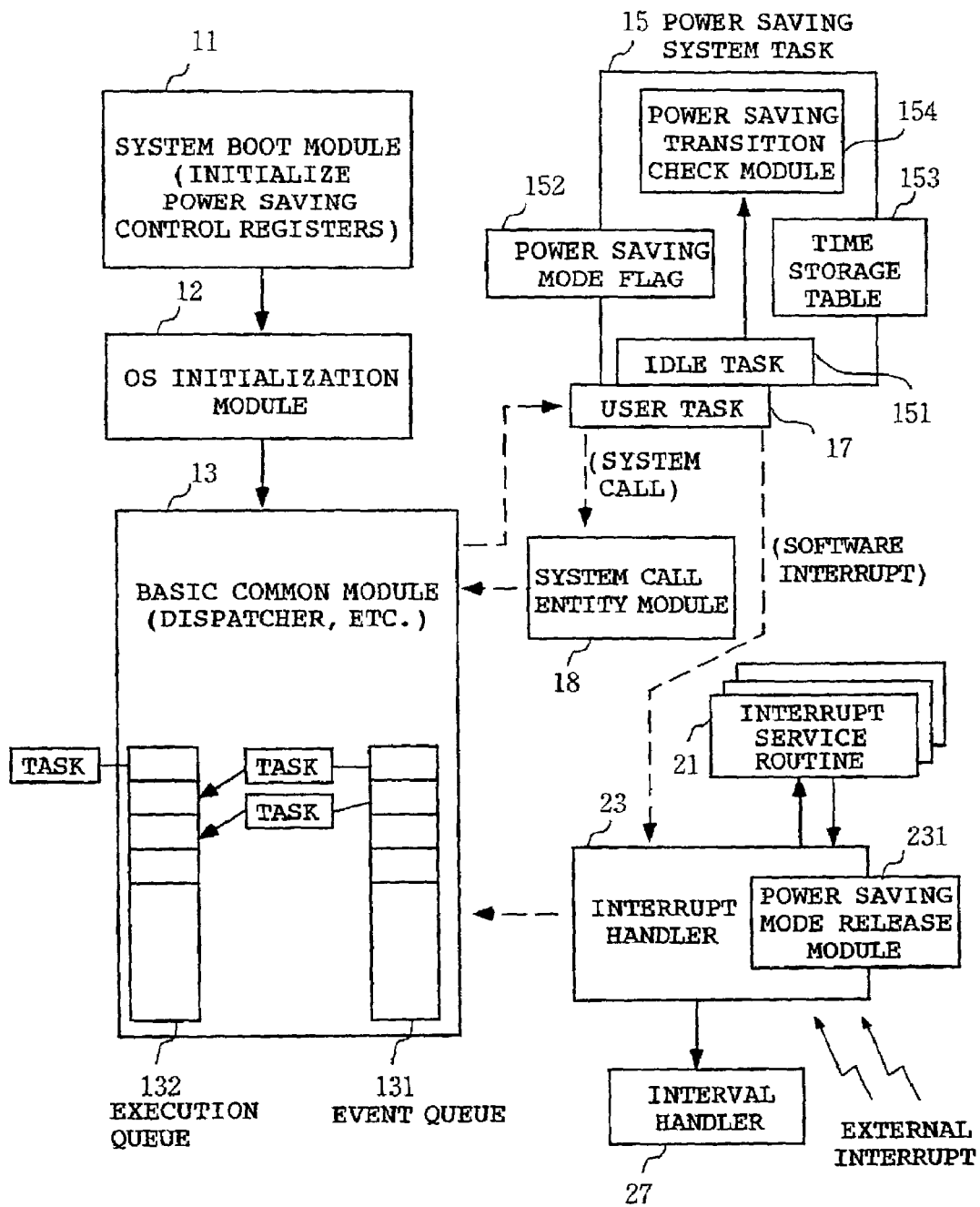
FIG. 1 is a block diagram showing the software configuration of a computer system that implements power saving according to the present invention.

FIG. 1 shows the software configuration of a computer system that implements power saving according to the present invention. This power saving function is implemented by a real time OS. The computer system to which the present invention is applied is preferably a battery-powered portable data processing device (cellular phone, PDA, notebook personal computer, and so on). The present invention may also be applied to power-saving intended FA/OA devices, such as a printer, a copier, a facsimile machine, etc.

Referring to FIG. 1, a system boot module 11 primarily initializes the hardware; for example, it sets initial values in control registers used to control the operation frequency (internal clock) of a CPU (Central Processing Unit) and to control a system bus, memory, and so on. In this embodiment, the system boot module also initializes the control register that makes the power-saving function available. This initialization may be performed when the device power is turned on or reset. In this embodiment, the timer control register is set during timer interrupt initialization in such a way that a timer interrupt is generated in response to an interrupt from the RTC (Real Time Clock). The RTC is a hardware timer that outputs current time data. The RTC is used to generate a timer interrupt to prevent the period of the timer interrupt from being affected by a change in an external clock. It should be noted that the present invention is not limited to this method of timer interrupt generation but that a timer interrupt may be generated using a timer that will be described below (422 in FIG. 2). The system boot module 11 also initializes the counter registers of the RTC (sets entered initial values).

An OS initialization module 12 initializes the tables or queues that will be described below. A basic common module 13 includes an event queue 131 and an execution queue 132 to allocate tasks to the CPU. Connected to the event queue 131 are event-waiting tasks that are waiting for events to be generated. Connected to the execution queue 132 are tasks being executed or executable tasks, such as tasks released from the event-waiting state or the like.

There are two types of task: user task 17 that is related to user programs and system task that is related to system programs. One of the system tasks is an idle task 151. The idle task 151, a lowest-priority task connected constantly to the execution queue 132, is executed when there is no task (user task and so on), in the execution queue 132, whose priority is higher than that of the idle task. In this embodiment, a new function is added to the idle task 151 to allow the computer system to move to the power saving mode. That is, a power saving transition check module 154 is added. For use with this function, a power saving mode flag 152, which identifies a power saving mode to be entered, and a time storage table 153 are also provided. Such an idle task whose function is extended as described above is referred to as a power saving system task 15.

A system call entity module 18 manages tasks or other system resources that the OS makes available to user tasks.

An interrupt handler 23 activates a corresponding interrupt service routine 21 in response to an external interrupt or a request from a task (software interrupt). In this embodiment, the interrupt handler 23 has a power saving mode release module 231 added. The power saving mode release module 231 is always activated before the interrupt handler 23 activates the interrupt service routine 21 for each interrupt cause. This module performs processing to return the computer system, which has moved to the power saving operation mode (also called simply as power saving mode), back to the normal operation mode based on a predetermined external cause. An interval handler 27 that performs periodic processing is connected to the interrupt handler 23 to perform operation especially in response to a timer interrupt.

Figure 2:
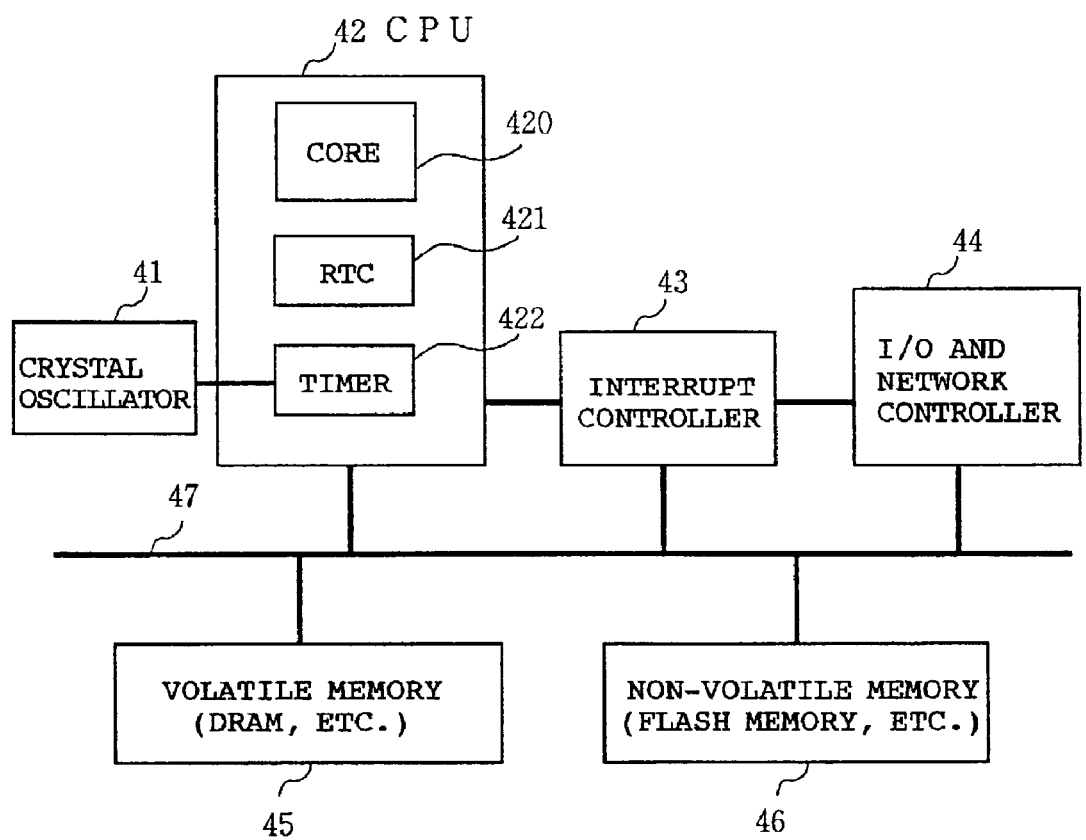
FIG. 2 is a block diagram showing the hardware configuration of the computer system to which the present invention is applied.

FIG. 2 shows the hardware configuration of the computer system to which the present invention is applied. A CPU 42 primarily comprises a core unit 420, an RTC 421, and a timer 422.

The core unit 420 controls the operation mode and the operation frequency (rate) of the CPU 42, controls the system bus 47 and other components connected to the system bus which will be described below, and executes programs. The RTC 421 is as described above. The timer 422 generates a timer interrupt in response to a clock from a crystal oscillator 41. The RTC 421 may use a clock from the crystal oscillator 41 or a clock from a dedicated clock generator within itself. In this specification, the RTC 421 and the timer 422 are both referred to as hardware timers.

Not only the CPU 42 but also an interrupt controller 43, an I/O and network controller 44, a volatile memory (DRAM and so on) 45, and a non-volatile memory (flash memory and so on) 46 are connected to the system bus 47. A program to be executed by the CPU 42 is stored in the non-volatile memory 46. This program may be executed in the non-volatile memory 46. Or, the program may be loaded into the volatile memory 45 for execution.

The interrupt controller 43 checks if an interrupt from an interrupt input/output (interrupt I/O) or a network is to be accepted. If the interrupt is to be accepted, the controller accepts the interrupt and sends it to the CPU 42. Even if the CPU 42 is in the power saving operation mode, an interrupt sent from the interrupt controller 43 returns the computer system to the normal operation mode.

Figure 3:
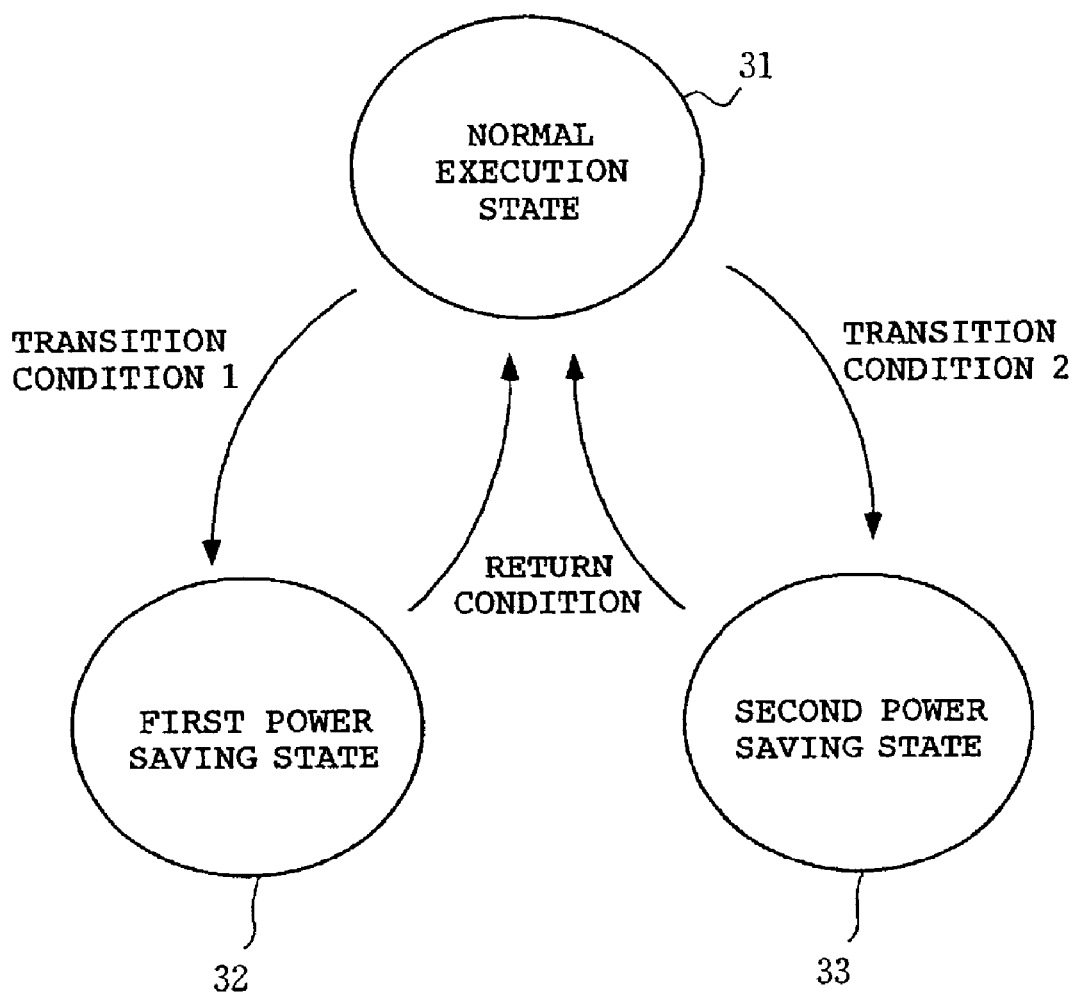
FIG. 3 is a state transition diagram related to power saving in an embodiment of the present invention.

FIG. 3 is a state transition diagram related to power saving in this embodiment. As shown in this diagram, two power saving operation modes (power saving states)—first and second states each associated with its own power saving effect (power saving level)—are provided. The computer system in a normal execution state 31 moves to a first or a second power saving state 32 or 33, respectively, when a transition condition 1 or 2 is satisfied. From any of these power saving modes, the computer system returns to the normal execution state 31 when a predetermined condition is satisfied. As described above, the return condition is an interrupt from the internal timer 422 (FIG. 2) or an interrupt caused by an external factor such as an arrival of a packet from a network. The return condition may differ between the first power saving state and the second power saving state.

Switching to one of power saving modes, each having its own power saving effect, makes it possible to realize a power saving state appropriate for a situation.

The two power saving modes, each with its own power saving effect, may be selected from a plurality of power saving states shown below.

(1) Low-Speed Execution

In this state, the CPU speed (CPU operation clock frequency) is reduced to a speed lower than the normal speed. The CPU operation clock, generated by dividing the clock from the crystal oscillator 41 shown in FIG. 2, is used.

(2) Sleep State

In this state, the operation of all or part of the CPU and peripheral modules is stopped with the contents of the registers and memory retained. There are the following three types of sleep state:

(2-1) Module-by-Module Sleep

The operation of external and internal peripheral modules not being used is stopped. The technology disclosed in Japanese Patent Laid-Open Publication No. Hei 7-261889 described above is thought to correspond to this state.

(2—2) Semi-Sleep

With only the external and internal peripheral modules that generate a reactivation interrupt kept active, the CPU operation is stopped by stopping the CPU operation clock. The external (bus) clock remains active. This semi-sleep state is further divided into a first semi-sleep state that allows a timer interrupt and a second semi-sleep state that disables a timer interrupt. The external clock is generated directly from the crystal oscillator 41, or is generated by dividing the clock from the crystal oscillator 41.

(2-3) Complete Sleep

The external (bus) clock is also stopped and therefore the CPU and the internal peripheral modules are stopped.

(3) Suspended

The states of the registers and the memory are saved in the non-volatile memory, and then power is turned off.

(4) Stopped

Power is turned off without saving the states of the registers and the memory.

Figure 4:
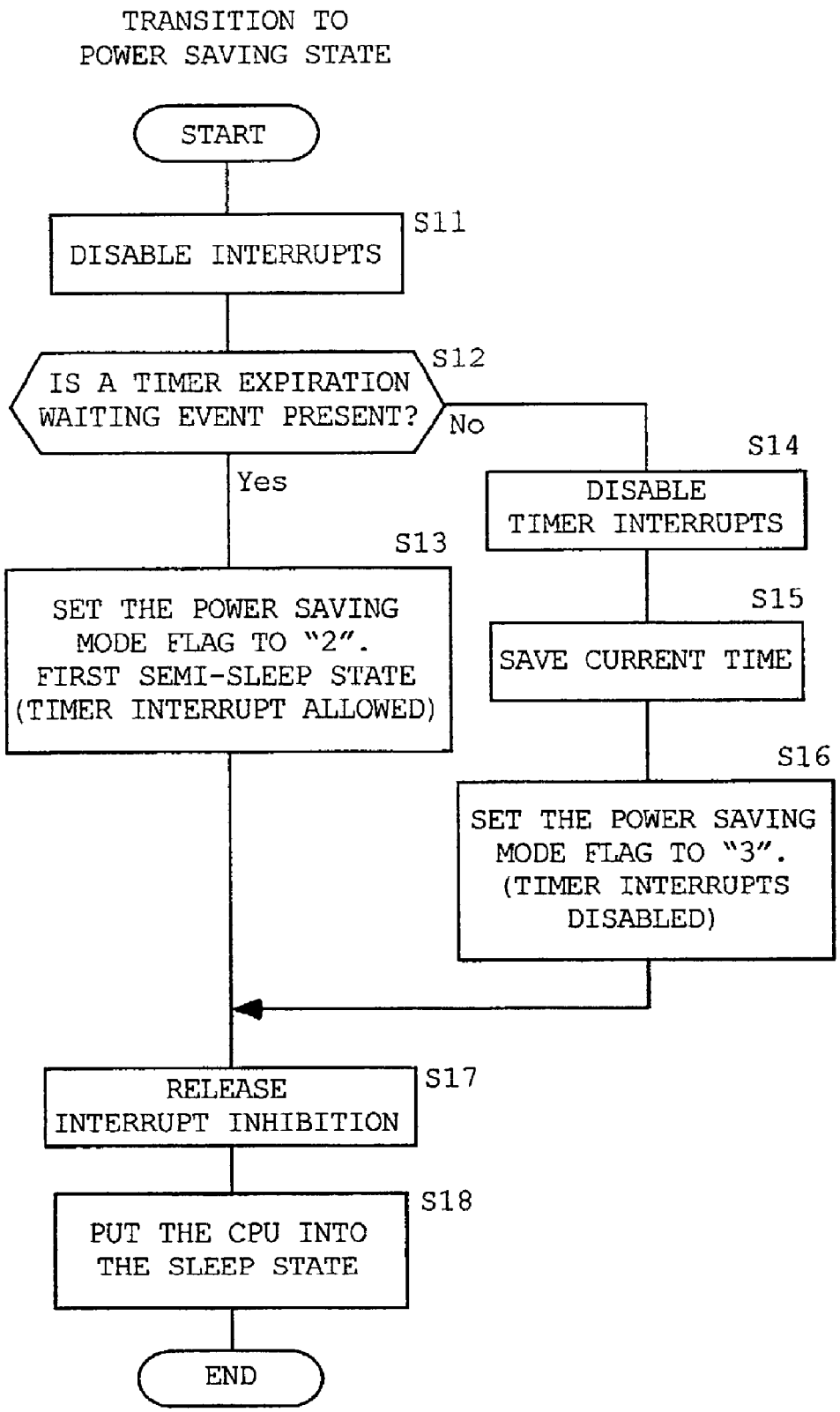
FIG. 4 is a flowchart showing the processing flow used when the computer system moves to a power saving state in the embodiment of the present invention.

The following power saving mode flag values are assigned to the normal execution state and the various power saving states:

0: Normal execution state (Normal operation mode)
1: Low-speed execution state
2: First semi-sleep state (timer interrupt operation allowed)
3: Second semi-sleep state (timer interrupt operation disabled)
4: Complete sleep state
5: Suspended state The larger the item number is, the higher the power saving effect is. However, because a state with a higher power saving effect sometimes requires long time to return to the normal execution state or, in some cases, power saving is not actually effective, it is important to decide which power saving state is to be used in which case. With reference to FIG. 4, a processing flow showing how the power saving transition check module 154, shown in FIG. 1, performs power saving state transition will be described. In this example, the first semi-sleep state (flag value "2") and the second semi-sleep state (flag value "3") are used as the first and the second power saving states 32 and 33 (FIG. 3). However, it should be noted that the present invention is not limited to these power saving states.

First, the interrupt operation is disabled temporarily to perform this processing (S11). The interrupts to be disabled in this case are those except NMIs (Non-Maskable Interrupts). A check is made to see if a timer-expiration-waiting event is present in the event queue 131 (S12). If such an event is present, the power saving mode flag 152 (FIG. 1) is set to "2" (S13). As described above, this flag value indicates a semi-sleep state that allows a timer interrupt operation, that is, the first semi-sleep state. After that, interrupt disabling is released (S17), the CPU is put in the sleep state (S18), and the processing ends.

When moving to some other power saving state, for example, to the complete sleep state, it is also possible to control the operation in such a way that, by referencing the value of the power saving mode flag during execution of this instruction, the system is put in the sleep state corresponding to the mode indicated by the power saving flag value.

If there is no timer-expiration-waiting event in step S12, the timer interrupt operation is disabled (S14). This is performed, for example, by setting the predetermined bit of a particular register in the CPU to "0". The timer interrupt operation is disabled in this way because, if the timer interrupt remained activated when there is no timer-expiration-waiting event, the CPU would return from the power saving state to the normal execution state each time a timer interrupt is received and therefore the effect of power saving would be lost. Disabling the timer interrupt also stops the periodic processing operation of the interval handler 27 (FIG. 1).

After that, the current time of the RTC is saved in the time storage table 153 (FIG. 1) (S15). This is a preparatory processing executed in advance in order to restore the software timer value when the CPU returns to the normal execution state, because disabling the timer interrupt prevents the timer value of the software timer from being updated. The software timer is a timer maintained by the interrupt service routine 21 (FIG. 1), which corresponds to the timer 422 (FIG. 2), to update and maintain the date/time data on a software basis. This date/time data is independent of the date/time data of the RTC and used for an arbitrary application. Therefore, if the updating is temporarily suspended due to the power saving control, the date/time data must be restored at a later time for use by the application.

Subsequently, the power saving mode flag is set to "3" (S16). This flag value indicates the semi-sleep state that disables a timer interrupt operation, that is, the second semi-sleep state. After that, as in the case in which control is passed from step S13, the interrupt disabling is released (S17), and the CPU is put in the sleep state (S18). Then, the processing ends.

Figure 5:
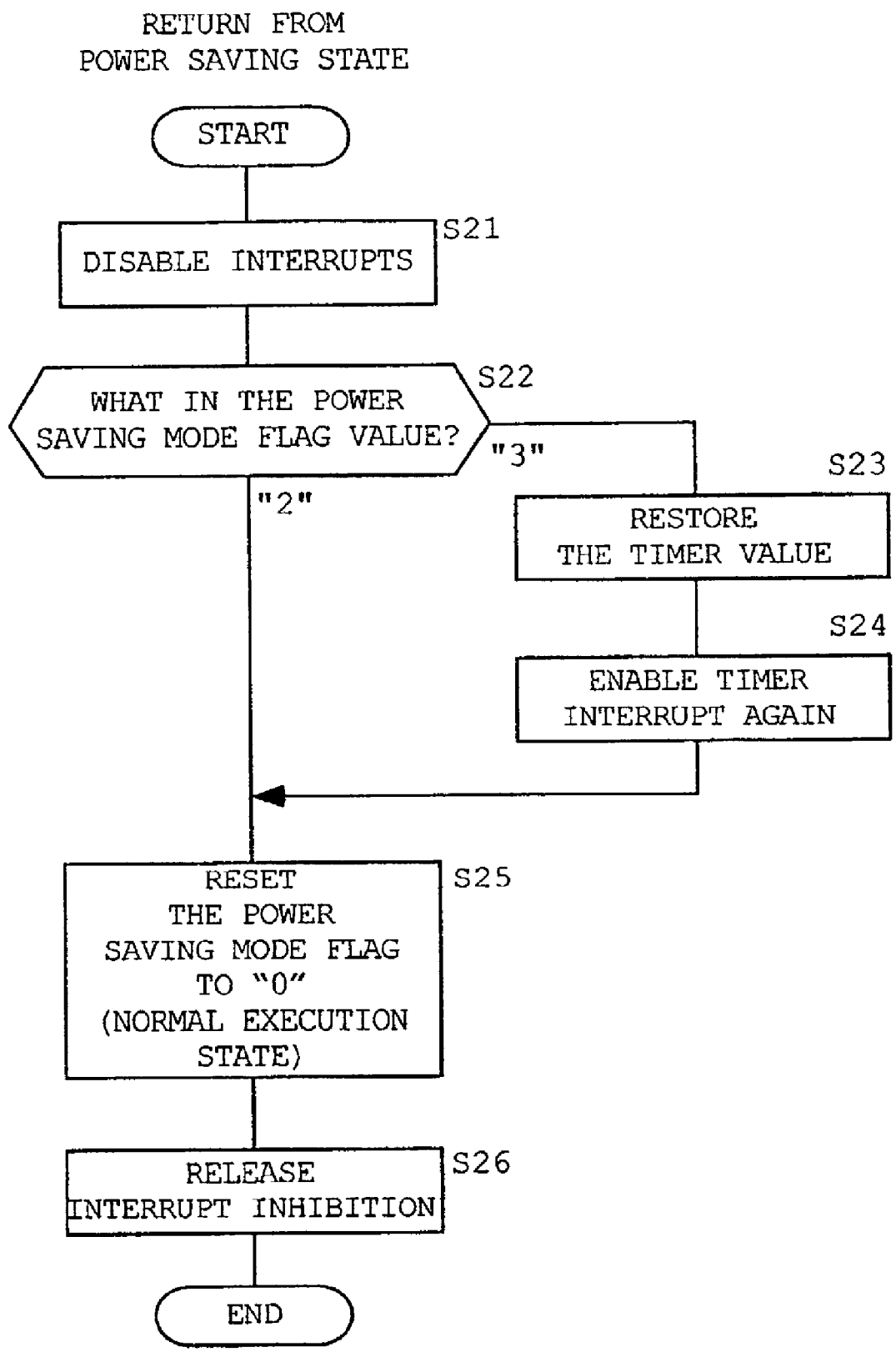
FIG. 5 is a flowchart showing the processing flow used when the computer system returns from the power saving state in the embodiment of the present invention.

Next, FIG. 5 shows the flow of processing performed by the power saving mode release module 231 in FIG. 1 when the CPU returns from the power saving state. The processing in this figure, corresponding to the example of the processing flow in FIG. 4, is executed in response to an occurrence of an interrupt. This interrupt returns the CPU from the sleep state 10 and, at the same time, activates the power saving mode release module 231.

In FIG. 5 interrupt operation is first disabled temporarily as in the processing shown in FIG. 4 (S21). Then, a check is made for the current power saving mode flag value (S22). If the flag value is "2", indicating the first semi-sleep state, the flag value is simply set to "0", that is, the state is returned to the normal execution state (S25).

If the flag value is "3" in step S22, the timer value of the timer 422 (FIG. 2) is first restored (S23). That is, the current time is obtained from the RTC 421 (FIG. 2), the elapsed time is calculated from the time saved in the time storage table 153 (FIG. 1), and the calculated elapsed time is added to the timer value. This corrects the timer value of the timer 422 based on the elapsed time that elapsed while the timer interrupt has been disabled. Next, the timer interrupt is enabled again (S24). After that, the power saving mode flag is set back to "0" (S25). Finally, interrupt disabling is released (S26) and the processing ends.

FIG. 6 shows the hardware configuration of a microprocessor to which the present invention is applied. In this figure, the same reference numerals denote the same structural elements. The microprocessor, with the CPU 42 implemented by an integrated circuit chip, may include the non-volatile memory 46 as shown in the figure. In the internal memory, the OS including the function according to the present invention may be included. Alternatively, the logic for executing the function of the present invention may be included in the microprocessor that is a hardware component implementing part of the OS.

While a preferred embodiment of the present invention has been described, it is to be understood that the present invention may be changed and modified in various ways within the scope of the claims attached herewith.

INDUSTRIAL APPLICABILITY

The present invention allows a power saving mode, appropriate to the computer system operation state, to be selected dynamically and, as a result, gives an increased power saving effect. The present invention can be realized by a special task (power saving system task) added to the OS, thereby eliminating the need for a user task program to be reprogrammed in order to incorporate the new power saving function.

What is claimed is:

1. A power saving control method for use on a computer system, comprising the steps of:
    checking, when there is no executable user task and therefore a CPU has entered an idle state, if any timer-expiration-waiting event is present in an event queue, which manages event-waiting tasks;
    switching the computer system to a first power saving operation mode when there is any timer-expiration-waiting event in the event queue, said first power saving operation mode stopping a CPU operation clock while allowing a timer interrupt to be accepted;
    switching the computer system to a second power saving operation mode when there is no timer-expiration-waiting event in the event queue, said second power saving operation mode inhibiting the timer interrupt while stopping the CPU operation clock;
    saving the time of a hardware timer when entering the second power saving operation mode;
    returning the computer system from the first or the second power saving operation mode to a normal operation mode in response to an occurrence of an interrupt; and
    detecting the time of the hardware timer when the computer system returns from the second power saving operation mode to the normal operation mode, calculating an elapsed time from the saved time, and correcting a timer value of a software timer based on the elapsed time.

2. A computer system comprising a CPU having a real-time operating system, wherein said real-time operating system comprises:
    an execution queue that manages a queue of execution waiting tasks;
    an event queue that manages event waiting tasks; and
    a power saving transition check module that checks if there is any timer-expiration-waiting event in the event queue when there is no executable user task in the execution queue and therefore a CPU has entered an idle state and, depending upon whether or not there is any timer-expiration-waiting event in the event queue, switches the computer system from a normal operation mode to a first power saving operation mode or to a second power saving operation mode that has a power saving effect different from that of the first power saving operation mode, and
    a power saving mode release module that returns the computer system from the first or the second power saving operation mode to the normal operation mode according to a predetermined return condition,
    wherein, when there is no executable user task and therefore the CPU has entered the idle state, said power saving transition check module switches the computer system to the first power saving operation mode when there is any timer-expiration-waiting event in the event queue, said first power saving operation mode stopping a CPU operation clock while allowing a timer interrupt to be accepted, switches the computer system to the second power saving operation mode when there is no timer-expiration-waiting event in the event queue, said second power saving operation mode inhibiting the timer interrupt while stopping the CPU operation clock and, at the same time saves the time of a hardware timer, and wherein said power saving mode release module returns the computer system from the first or the second power saving operation mode to the normal operation mode in response to an occurrence of an interrupt, detects the time of the hardware timer, calculates an elapsed time from the saved time, and corrects a timer value of a software timer based on the elapsed time.

3. A recording medium storing therein a computer readable program executing the steps of:
    checking, when there is no executable user task and therefore a CPU has entered an idle state, if any timer-expiration-waiting event is present in an event queue, which manages event-waiting tasks;

switching the computer system to a first power saving operation mode when there is any timer-expiration-waiting event in the event queue , said first power saving operation mode stopping a CPU operation clock while allowing a timer interrupt to be accepted;

switching the computer system to a second power saving operation mode when there is no timer-expiration-waiting event in the event queue, said second power saving operation mode inhibiting the timer interrupt while stopping the CPU operation clock;

saving the time of a hardware timer when entering the second power saving operation mode;

returning a computer system from the first or the second power saving operation mode to a normal operation mode in response to an occurrence of an interrupt; and detecting the time of the hardware timer, when the computer system returns from the second power saving operation mode to the normal operation mode, calculate an elapsed time from the saved time, and correct a timer value of a software timer based on the elapsed time.

4. A microprocessor having a function of a real-time operating system, wherein said real-time operating system comprises:

an execution queue that manages a queue of execution waiting tasks;

an event queue that manages event waiting tasks;

a power saving transition check module that checks, when there is no executable user task in the execution queue and therefore a CPU has entered an idle state, if there is any timer-expiration-waiting event in the event queue and, depending upon whether or not there is any timer-expiration-waiting event in the event queue, switches the microprocessor from a normal operation mode to a first power saving operation mode or to a second power saving operation mode that has a power saving effect different from that of the first power saving operation mode; and a power saving mode release module that returns the computer system from the first or the second power saving operation mode to the normal operation mode according to a predetermined return condition;

wherein when there is no executable user task and therefore the CPU has entered the idle state, said power saving transition check module switches the computer system to the first power saving operation mode when there is any timer-expiration-waiting event in the event queue , said first power saving operation mode stopping a CPU operation clock while allowing a timer interrupt to be accepted, switches the computer system to the second power saving operation mode when there is no timer-expiration-waiting event in the event queue, said second power saving operation mode inhibiting the timer interrupt while stopping the CPU operation clock and, at the same time saves the time of a hardware timer, and wherein said power saving mode release module returns the computer system from the first or the second power saving operation mode to the normal operation mode in response to an occurrence of an interrupt, detects the time of the hardware timer, calculates an elapsed time from the saved time, and corrects a timer value of a software timer based on the elapsed time.

\* \* \* \* \*